(12) United States Patent
Hitomi

(10) Patent No.: US 6,343,418 B1
(45) Date of Patent: Feb. 5, 2002

(54) SPINNING REEL FACE GEAR MANUFACTURING METHOD

(75) Inventor: Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/599,943

(22) Filed: Jun. 23, 2000

Related U.S. Application Data

(63) Continuation-in-part of application No. 09/101,884, filed as application No. PCT/JP97/04238 on Nov. 20, 1997, now Pat. No. 6,095,008.

(51) Int. Cl.⁷ .............................................. F16H 55/22
(52) U.S. Cl. ............................... 29/893.35; 29/893.37; 164/98; 264/274
(58) Field of Search ........................ 29/893.35, 893.37; 164/98, 112; 264/273, 274, 279

(56) References Cited

U.S. PATENT DOCUMENTS 3,530,735 A  9/1970  Allen
5,271,287 A  12/1993  Wadleigh

*Primary Examiner*—P. W. Echols
(74) *Attorney, Agent, or Firm*—Shinjyu Global IP Counselors, LLP

(57) ABSTRACT

A spinning reel face gear is manufactured by a method of molding tooth-ring bearing, obverse-facing gear teeth onto a separately formed gear disk after the gear disk is made. The gear disk is specially configured with circumferentially spaced peripheral indentations to retain the tooth ring strongly against torque when the face gear meshes with a pinion gear in operation in a spinning reel. Manufacturing the face gear in two separate stages adds a degree of freedom in material selection, allowing a lightweight material to be employed for the gear disk, and a high-strength material for forming precision gear teeth to be employed for the tooth ring. The two-stage manufacturing method also enables the tooth ring to be formed onto the gear disk in a mold that does not leave a parting line on the obverse, teeth-bearing face of the tooth-ring when the mold plates are parted.

9 Claims, 6 Drawing Sheets

SPINNING REEL FACE GEAR MANUFACTURING METHOD

This is a continuation-in-part of application Ser. No. 09/101,884, filed Jul. 20, 1998, now U.S. Pat. No. 6,095,008 which was the National Stage of International Application No. PCT/JP97/04238, filed Nov. 20, 1997.

BACKGROUND OF THE INVENTION

1. Technical Field

The present invention relates to the manufacture of face gears provided on the handle shaft of spinning reels; in particular the invention relates to methods of diecasting such face gears.

2. Description of Related Art

Generally spinning reels have a reel main body, a rotor supported for free rotation on the main body, and a spool that peripherally winds on fish line, provided forward of the rotor. The rotor rotates unitarily with a pinion gear provided peripherally on the spool axle. The spool reciprocates back and forth by means of a level-wind mechanism that is driven by an intermediate gear that meshes with the pinion gear. The pinion gear meshes with a face gear (master gear) provided on a handle rotation axle (handle shaft) that is orthogonal to the pinion gear, and is rotated by rotation of the handle. The face gear is usually formed incorporated with the handle shaft. Conventionally zinc alloys have been comparatively widely used as a material for cheaply manufacturing the face gear that includes the handle shaft, and for maintaining its strength.

Generally with spinning reels, designing the face gears to make them lightweight to elevate casting performance is important. Further, it is also important to improve corrosion resistance in order to prolong the face gear life span. With the conventional face gears, however, zinc alloys, which are of high relative density and are inferior in corrosion resistance, are utilized. Thus the conventional use of zinc alloys impairs lightweight design, and makes improving corrosion resistance problematic.

Therein, consideration has been given to using aluminum alloys as a face gear material for designing the face gear to be lightweight, and further, to using stainless steel alloys as a face gear material in order to improve the corrosion resistance. Due to the inferior strength of aluminum alloys compared to zinc alloys, along with inferior manufacturing precision wherein die-casting or the like is to be carried out, however, when utilizing aluminum alloys as a face gear material, the strength and precision of the teeth of the face gears deteriorates. Furthermore, while stainless steel alloys are of better strength compared to zinc alloys, owing to poor workability along with problems generally in injection molding, it is difficult to improve precision; when employing stainless steel alloys the precision of the face gear teeth is liable to deteriorate.

SUMMARY OF THE INVENTION

An object of the present invention is to achieve a method of manufacturing spinning reel lightweight face gears that ensures that the strength and precision of the face gears thus manufactured is maintained.

Another object of the invention is to provide for the manufacture of face gears of improved corrosion resistance that ensures that the strength and precision of the face gears thus manufactured is maintained.

A further object is a method of die-casting spinning-reel face gears wherein a high-strength tooth ring is formed onto a lightweight gear plate and in which high gear-meshing precision of the teeth is ensured by the casting process.

A spinning reel face gear according to a first aspect of the present invention is provided on the handle shaft of a pinning reel, and is furnished with a disk, and a tooth ring formed on the perimeter of the disk of a material different from the disk. With this face gear, because the tooth ring that is to be the meshing portion is formed of a separate material from the disk, it is possible to design a lightened face gear of improved anti-corrosiveness, maintaining its strength and precision, by manufacturing the disk with lightweight materials and materials that are anti-corrosive, and by manufacturing the tooth ring with materials by which its strength and precision are maintainable.

According to a second aspect, the spinning reel face gear is as set forth in the foregoing first aspect, and further wherein the handle shaft is formed unitarily with the disk. Herein, since the handle shaft and disk are formed unitarily, the number of parts is reduced, and the manufacturing costs and assembly costs are decreased.

In a third aspect of the invention, a spinning reel face gear is as set forth in the foregoing aspects, yet further wherein the fabrication material of the disk is aluminum alloy or stainless steel alloy, and the tooth ring fabrication material is zinc alloy or a synthetic polymer resin. Herein, the disk can be lightened and designed for improved anti-corrosiveness; moreover, manufacturing the teeth of zinc alloy or a high-strength synthetic polymer maintains teeth strength and precision.

A spinning reel face gear according to a fourth aspect of the present invention is a gear as set forth in the above-described aspects, and further wherein the tooth ring is formed on the perimeter of the disk by a post-molded insert process. Herein, the disk is specially manufactured; if the disk were otherwise formed as a single body with the tooth ring, bending and warping are liable to occur depending on the thickness and weight. Manufacturing the disk as a parent item enables forming the tooth ring by a post-molded insert process, further heightening the precision of the teeth and improving the gear-meshing precision.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
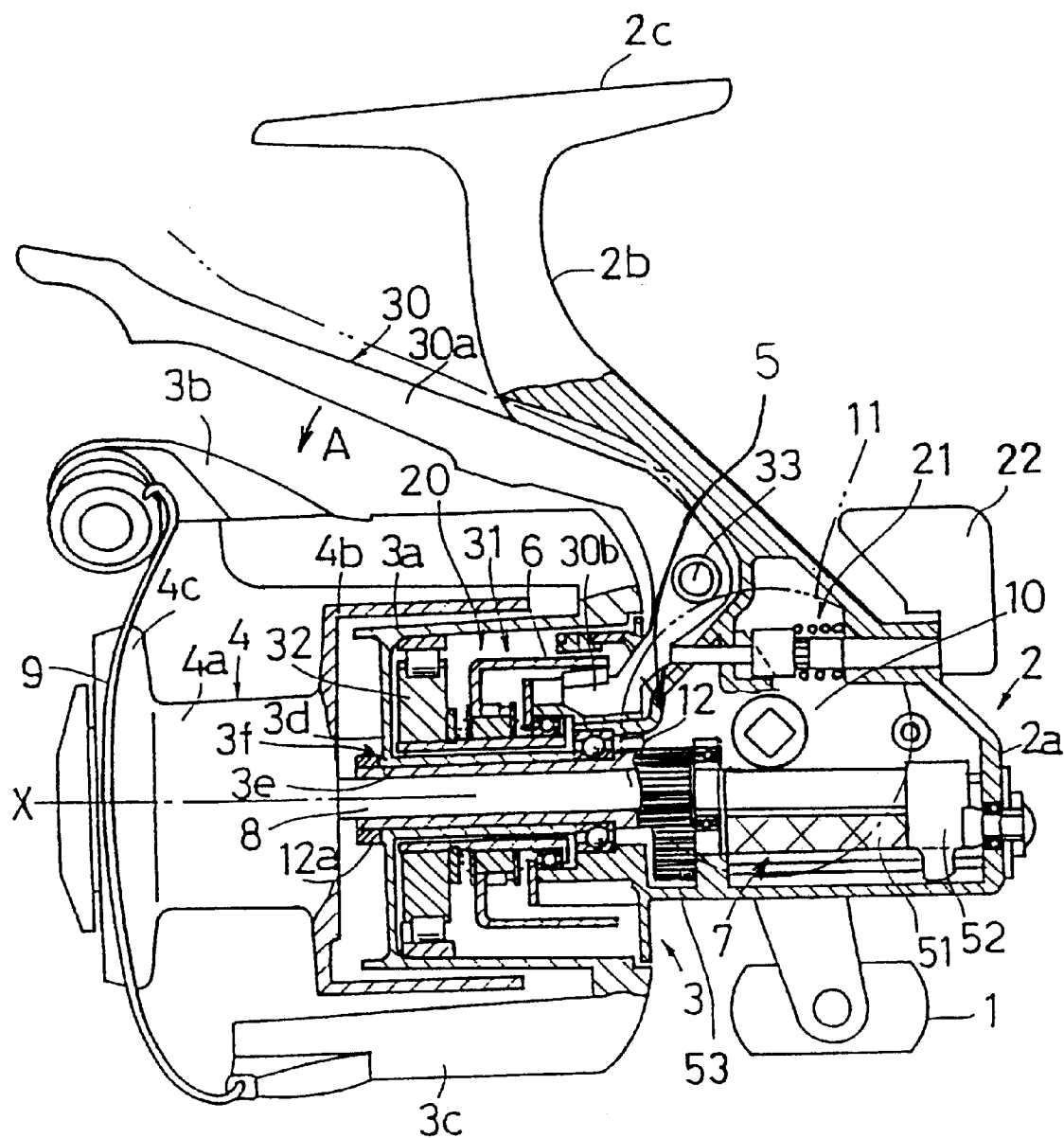
FIG. 1 is a partially in section lateral view of a spinning reel in which an embodiment of the present invention is adapted.

The spinning reel in which an embodiment of the present invention is adapted, shown in FIG. 1, is provided with: a reel main body 2 furnished with a handle 1; a rotor 3 supported for spinning on the front portion of the reel main body 2; and a spool 4 that winds on fish line and is disposed forward of the rotor 3.

The reel main body 2 has a body 2a, and a mount 2b is formed on its upper portion for mounting the spinning reel onto a fishing rod. The upper surface of the mount 2b forms a fitting portion 2c that attaches to a fishing rod. A rotor drive mechanism 5 for spinning the rotor 3; a rotor braking mechanism 6 for braking the rotor 3; and a level-wind mechanism 7 for uniformly winding fish line onto the spool 4 by shifting the spool 4 back and forth along rotational axis X; are provided in the interior of the body 2a.

The rotor 3 comprises a cylindrical member 3a and mutually opposing first and second arms 3b and 3c provided laterally of the cylindrical member 3a. A boss 3f is formed in the center of a front wall 3d of the cylindrical member 3a, and has a through hole 3e through which a spool shaft 8 and a pinion gear 12 (described later) pass. A bail 9 is provided to be pivotable between the tip end of the first arm 3b and the tip end of the second arm 3c.

The spool 4 is disposed between the first arm 3b and the second arm 3c of the rotor 3 and is attached to the tip end of the spool axle 8. The spool 4 comprises a line-winding bobbin 4a peripherally onto which fishing line is wound, a skirt 4b integrally formed on the rear of the (lipe-winding bobbin 4a, and a flange 4c fixed to the front end of the line-winding bobbin 4a. The level-wind mechanism 7 reciprocates the spool shaft 8 back and forth.

The rotor drive mechanism 5 includes a handle shaft 10 to which the handle 1 is fixed, a master gear 11 employing a face gear rotatable with the handle shaft 10, and a pinion gear 12 meshed with the master gear 11.

Figure 2:
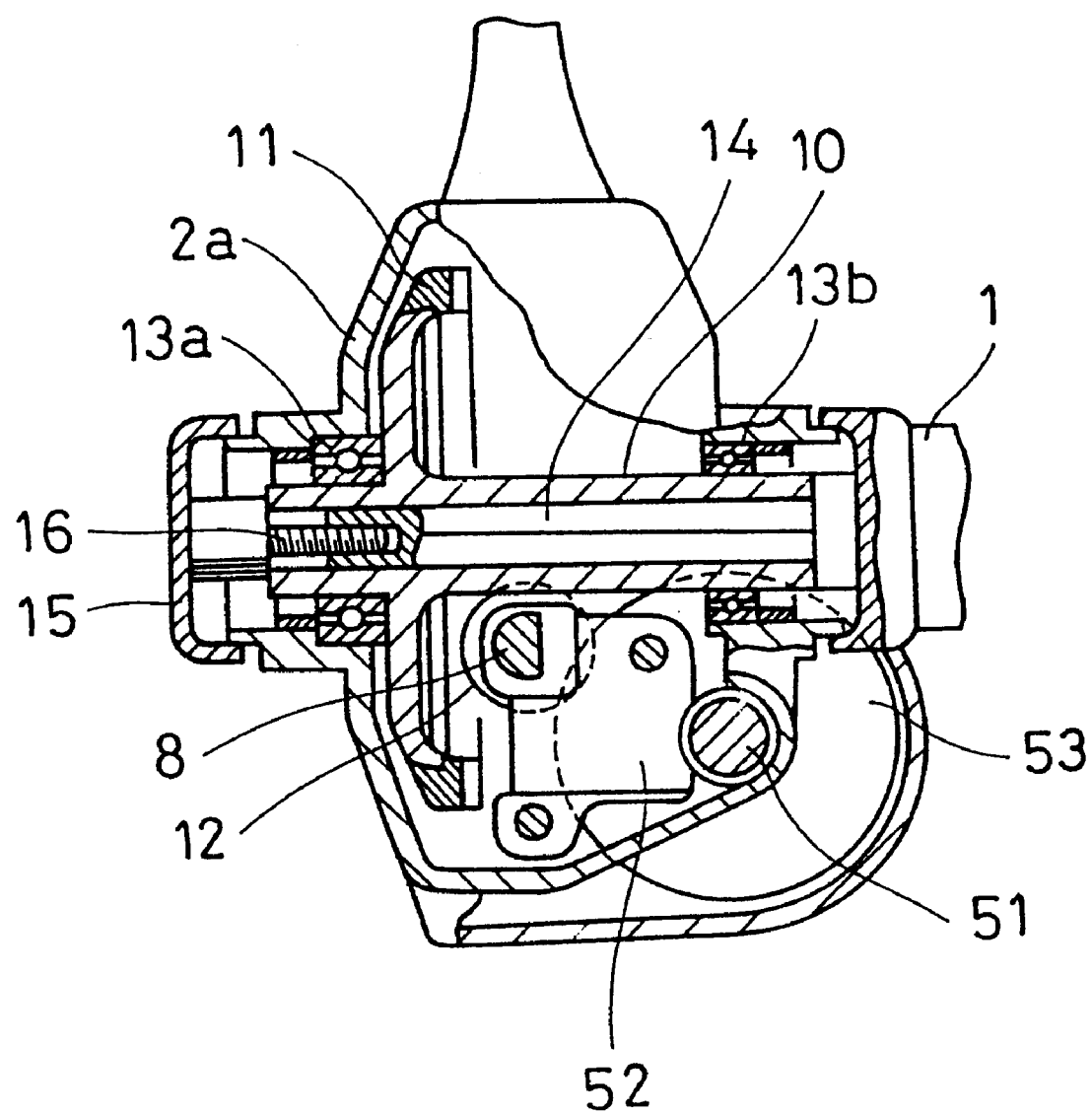
FIG. 2 is a partially in section, fragmentary view of the rear of the spinning reel depicted in FIG. 1.

The handle shaft 10, as shown in FIG. 2, is disposed transverse to the body 2a of the reel 2, and is supported for rotation on bearings 13a and 13b. The master gear 11 is formed integrally with the handle shaft 10. The pinion gear 12 is cylindrically formed and is disposed beneath the handle shaft 10, along a longitudinal direction orthogonal to the handle shaft 10. The front portion 12a of the pinion gear 12 passes through the center of the rotor 3, extending toward the spool 4.

An axle body 14 extending from the handle 1 and square in cross section is inserted non-rotatably into the center the handle shaft 10. The axle body 14 is fixed by a screw which extends from a cap 15 attached to the side of the body 2a. By this construction, the handle 1 is detachable and moreover can be disposed on either the right or left side of the reel main body 2.

Figure 3:
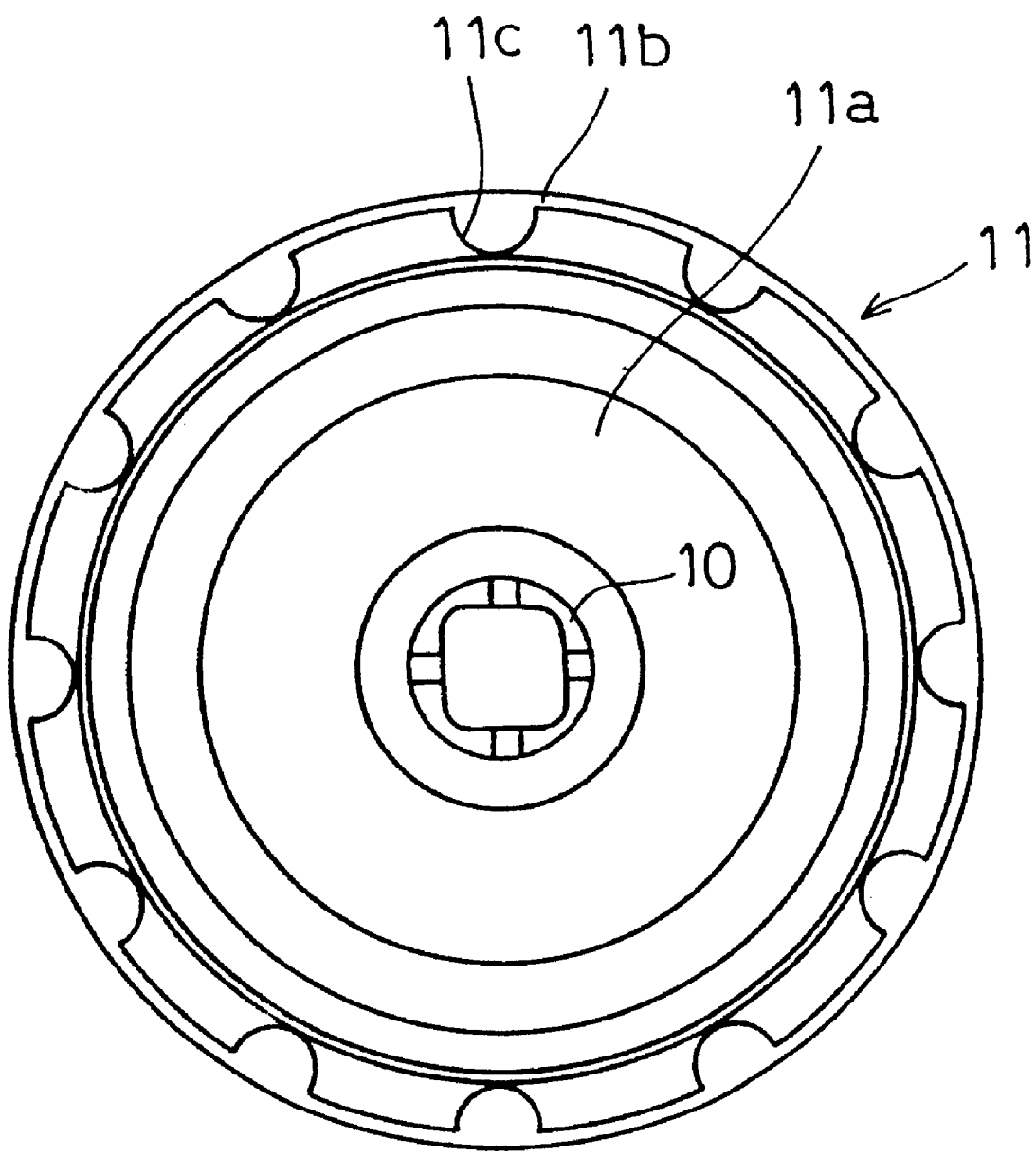
FIG. 3 is an elevational view of the rear of a master (face) gear formed unitarily with handle shaft, according to an embodiment of the invention.
Figure 4:
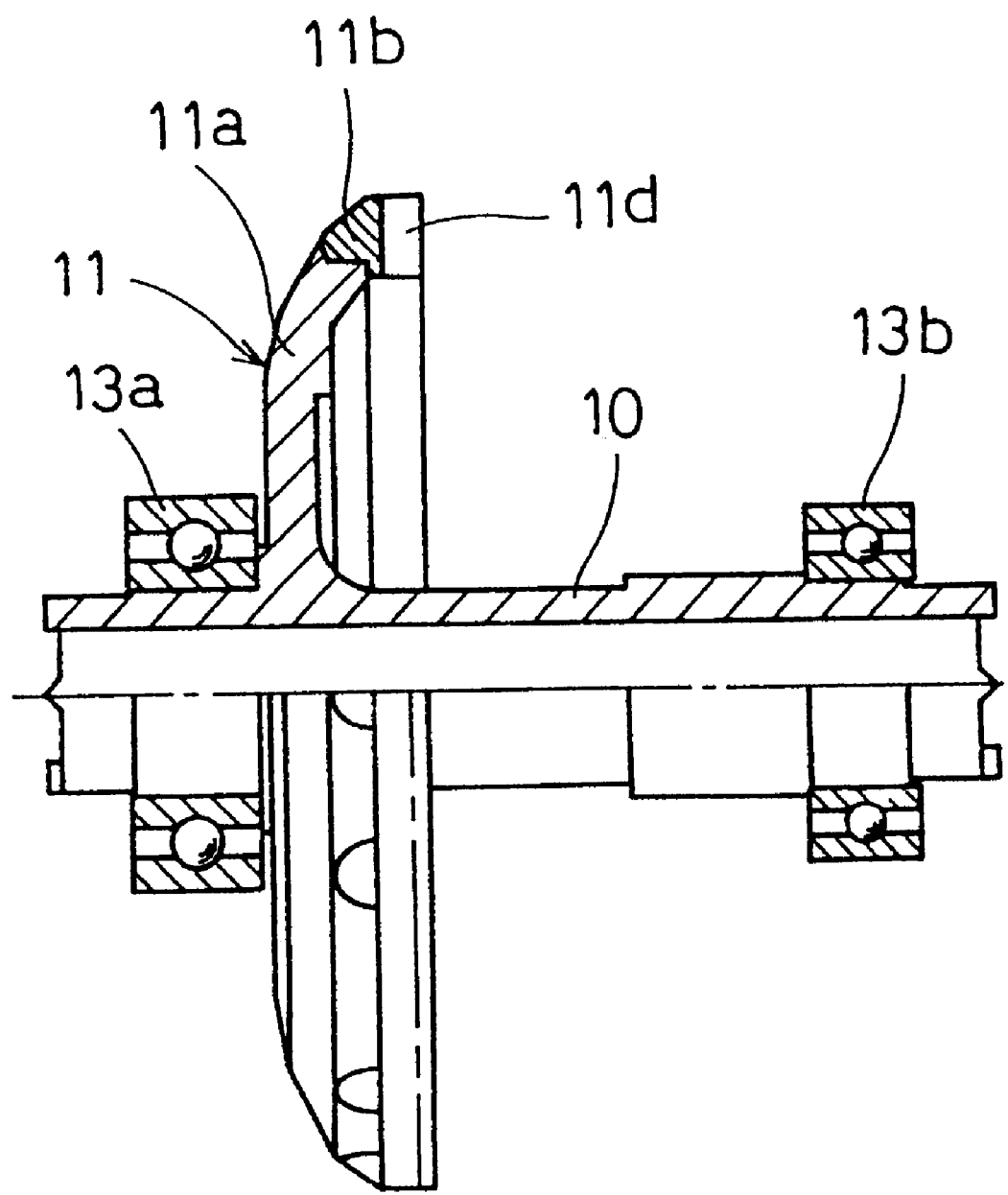
FIG. 4 is a partially in section view of the master gear of FIG. 3, with the handle shaft on bearings depicted in section.

The master gear 11, as shown in FIGS. 3 and 4, is provided with a disk 11a integral with the handle shaft 10, and a tooth ring 11b formed on the perimeter of the disk 11a of a material different from the disk 11a. As a fabrication material for the disk 11a, aluminum alloy may be utilized in order to lighten the design. Also, stainless steel alloy may be utilized in order to improve anti-corrosiveness in the design. Zinc alloy, or those high-strength synthetic resins which are the so-called "engineering plastics" such as polyacetal and nylon resin, may be utilized as a fabrication material for the tooth ring 11b in order to maintain its strength and precision. Circumferentially spaced semi-circular indentations 11c are formed on the perimeter of the disk 11a, and teeth 11d that serve as the face gear are formed terminally on tooth ring 11b. It is to be understood that of course the configuration of the indentations 11c is not limited to being semi-circular. By the formation of these indentations 11c, the adhesiveness between the disk 11a and the tooth ring 11b is improved, and torque is reliably transmitted from the disk 11a to the tooth ring 11b.

The tooth ring 11b is formed unitarily on the perimeter of the disk 11a by a post-molded insert process, described next with reference to FIGS. 6A–6C, wherein the disk 11a integral with the handle shaft 10 constitutes a gear blank 63.

First the gear blank 63 is molded or formed by, for example, a dropforging process. Then the gear blank 63 is positioned between the cavity plate 60a and core plate 60b of a mold 60, as schematically illustrated in FIGS. 6A–6C. FIG. 6A depicts the gear blank 63, comprising the disk 11a and the handle shaft 10, in position between the parted mold plates 60a, 60b. If the tooth ring 11b is to be formed of an engineering plastic, a runner 61 is provided for injecting the molten material. A serrated annular recess 62 is formed encompassing a core portion 64 of the core plate 60b to mold the teeth 11d in forming the tooth ring 11b onto the disk 11a.

Figure 6A:
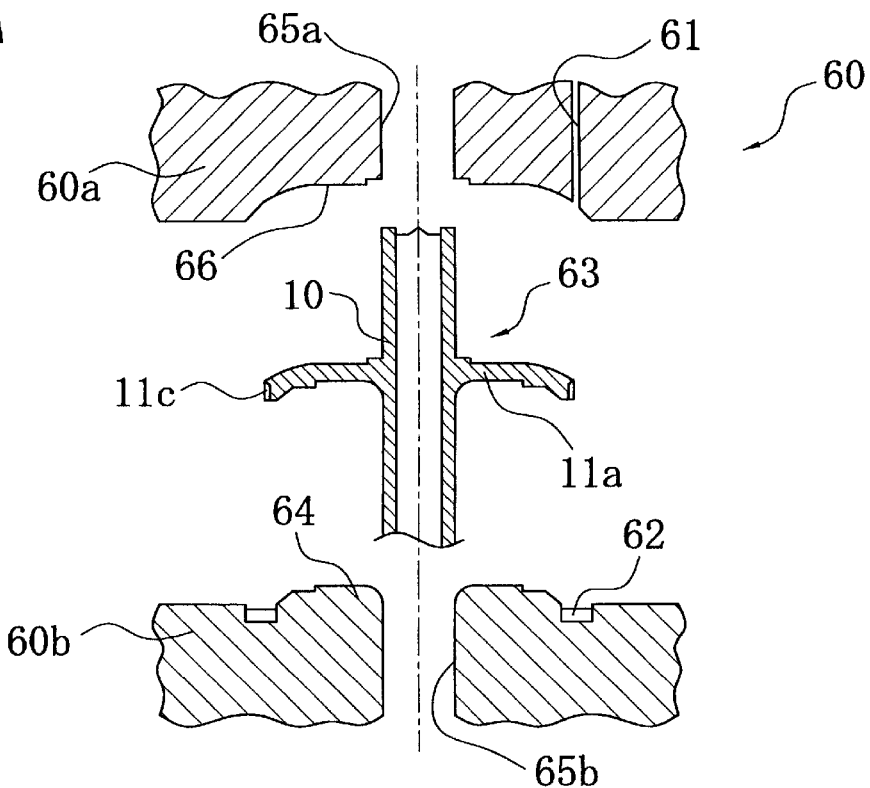
FIGS. 6A–6C are fragmentary, partially in section views through a post-molding insert injection mold parted from a unitary face-gear and handle-shaft blank according to an embodiment of the present invention.
Figure 6B:
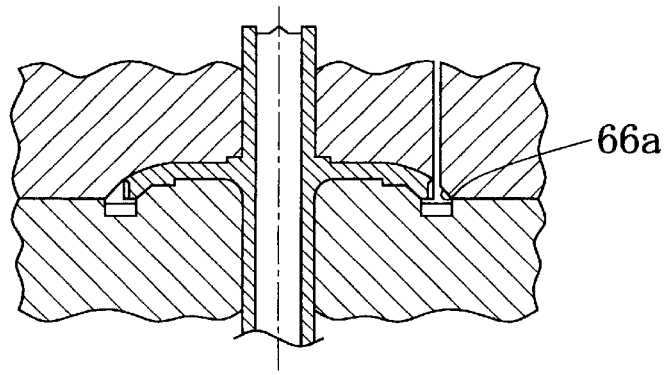
Figure 6C:
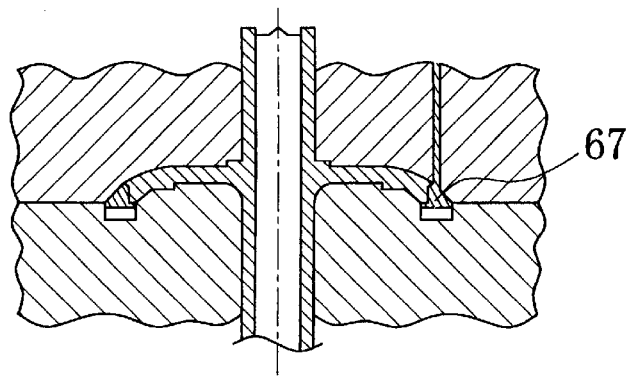

Although not indicated in FIGS. 6A–6C, the serrated annular recess 62 may taper slightly away from the molding face of the core plate 60b, thus chamfering the gear teeth 11d so as to ensure the tooth ring 11b post-molding inserted onto the disk 11a parts readily from the mold 60. Also not indicated in the figures is the fact that the serrated annular recess 62 is vented for plastic injection molding.

Corresponding holes 65a, 65b are formed in the cavity plate 60a and core plate 60b respectively, and become concentric to retain the handle shaft 10 on either side of the disk 11a when the mold 60 is closed, which state is illustrated in FIG. 6B. Therein, a post-molding tooth-ring insert form is established by the serrated annular recess X62, opposed by a portion 66a of the molding cavity 66 in the cavity plate 60a, and the circumferential periphery of the disk 11a in which the indentations 11c are formed.

FIG. 6C illustrates molten material being injected to form a tooth ring onto the disk 11a, wherein the indentations 11c have been filled by molten material 67.

When metal is die-cast to form the tooth ring 11b as a post-molding insert, generally high-temperature molten metal is not injected directly into the mold cavity in which the product is formed. A sink (not shown) from which the molten-metal will flow is provided in the mold 60 surrounding the blank 63.

By manufacturing a spinning reel face gear according to the present invention as described above, the parting line of the cavity plate 60a and core plate 60b does not appear on the gear-meshing face of the gear teeth lid of the postmolding inserted tooth ring 11b. The completed face gear is readily knocked out of the mold 60, while risk of compromising the structural integrity of the teeth 11d is minimized. Furthermore, the configuration of the gear blank 63, specially adapted for the method according to the present invention of post-molding formation of the tooth ring 11b, ensures the strength and meshing precision of the face gear accordingly manufactured.

In the above-described embodiment, the disk 11a of the master gear 11 is of aluminum-alloy or stainless steel-alloy, and the tooth ring 11b is of zinc-alloy or high-strength synthetic-resin manufacture. The present invention, however, is not limited by these, and such metals as titanium alloys that are lightweight and in which the anti-corrosiveness is high may be utilized for the disk 11a in order to lighten it and design for improvement in anti-corrosiveness. Further, other alloys that readily maintain strength and the precision may be utilized the tooth ring 11b.

It should be noted that the gear blank 63 does not have to include the handle shaft 10 integrally; the master/face gear 11 and the handle shaft 10 may be separate members. Further, it should be noted that other injection-molding processes than that depicted and described in the foregoing are possible. It should also be noted that the molding process according to the invention is irrespective of the configuration (cut) that forms the meshing face of the gear teeth 11d.

Turning now to the rotor braking mechanism 6, the mechanism has, as shown in FIG. 1, a brake 20 and a brake retaining mechanism 21 for retaining the brake 20 in its braking state. The brake retaining mechanism 21 has a pivot lever 22 pivotably supported by the body 2a. The pivot lever 22 enables switching a later-described brake lever 30 between a braking position and a braking release position, and moreover makes it possible to maintain the brake lever 30 in the braking position.

The brake 20 is provided with: a brake lever 30 pivotably supported by the body 2a; a brake main body 31 that is braked by the brake lever 30; and a one-way clutch 32 which operates to let the brake main body 31 rotate in only the rotational direction of the rotor 3 in which line is wound out.

The brake lever 30 is pivotably supported on body 2a by means of a support axle 33 in the boundary portion between the body 2a and the fastening part 2b, and furthermore is urged counter-clockwise in FIG. 1 by a not-shown urging element. The brake lever 30 has a manipulation lever 30a that extends in a curve from the support axle 33 diagonally upward, and on the end which extends in a curve from the support axle 33 diagonally downward brake operating portion 30b is provided. The tip end of the manipulation lever 30a is disposed adjacent to the mount 2c.

Figure 5:
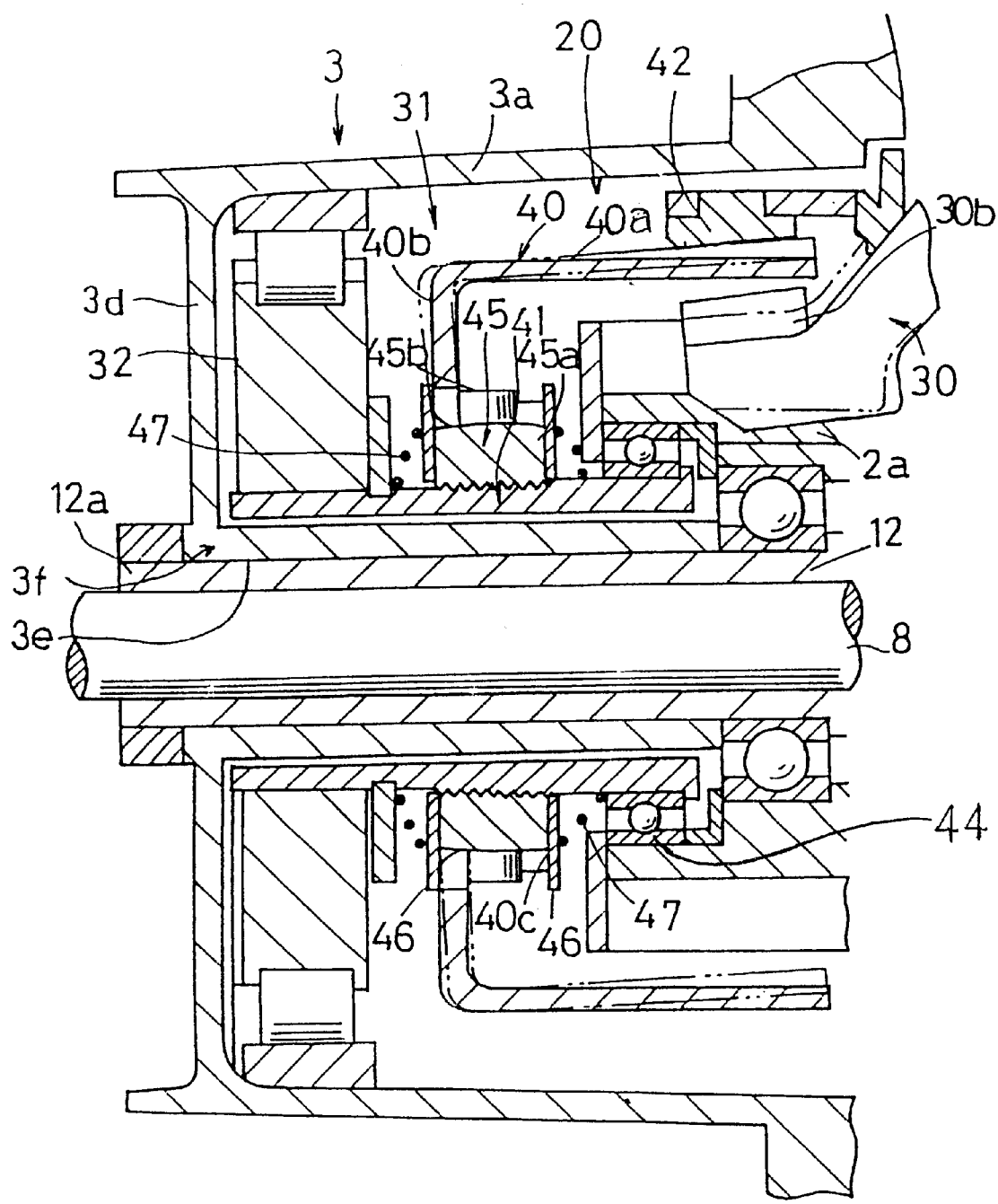
FIG. 5 is an enlarged, fragmentary and partially in section view illustrating essential components of a braking section of the reel depicted in FIG. 1.

The brake main body 31 has, as shown in FIG. 5: a brake cylinder 40 coaxially located along the inner peripheral side of the rotor 3; a rotary cylinder 41 that supports the brake cylinder 40 to be pivotable yet not able to rotate; and a brake shoe 42 attached to the body 2a.

The brake cylinder 40 is of a cylindrical form having a base. An end 40a of the outer peripheral surface of the brake cylinder 40 is disposed between the brake shoe 42 and the brake operation portion 30b of the brake lever 30. The brake cylinder 40 has, in the central portion thereof, a support surface 40c bent folding inward. The support surface 40c is cylindrical.

The front end of the rotation cylinder 41 is rotated unitarily by the one-way clutch 32 in the rotational direction of the rotor 3 in which line is wound out, and is supported so as not to respond to the rotor 3 torque during winding; the rear end of the rotation cylinder 41 is supported by the body 2a for rotation on a bearing 44. A universal joint 45 is provided on the circumferential mid-portion of the rotation cylinder 41 for supporting the support surface 40c. The universal joint 45 has a rotation ring 45a formed on the circumferential surface in a segmental sphere surface and screwed onto the rotation cylinder 41, and four round engagement nubs 45b protruding outward from the peripheral surface of the rotation ring 45a in cross formation. The engagement nubs 45b engage with the engagement grooves (not shown); and in the supporting of the support surface 40c by the rotation ring 45a, the brake cylinder 40 is supported non-rotatably yet pivotably on the rotation cylinder 41.

A pair of spring receiving rings 46 is disposed on neither side of and in contact with the rotation ring 45a. Between the right spring receiving ring 46 and the bearing 46 and between the left spring receiving ring 46 and the one-way clutch 32 conical coil springs 47 are disposed in a compressed state for maintaining the end of the brake cylinder 40 in a predetermined attitude in which the rim of the brake cylinder 40 does not contact the brake shoe 42 and the brake operation portion 30b of the brake lever 30.

Accordingly, since the brake cylinder 40 is supported non-rotatably yet pivotably on the rotation cylinder 41 that the brake cylinder 40 tilts into the position indicated by the double-dotted broken line in FIG. 2 when the brake is applied by the brake lever 30. However, since the brake cylinder 40 is pivotably supported on the rotation cylinder 41, when braking the rotation cylinder 41 and the pinion gear 12 are not liable to being acted upon by the bending moment or to being put out of whack, nor are they liable to exert influence on the rotation of the rotor 3 or to bring about rotational drag.

The one-way clutch 32 is an outer-race free type in which an outer race is fixed to the cylindrical portion of the rotor 3, and an inner race is fixed to the peripherally on the end of the rotation cylinder 41. The one-way clutch 32 transmits torque to the rotation cylinder 41 only in the direction the rotor 3 is rotated in winding out line. Therefore, when the rotor 3 is rotated in the winding-out line direction, the rotation cylinder 41 rotates and braking by the brake mechanism 6 is possible. On the other hand, when the rotor 3 is rotated in the line-winding direction, the rotation cylinder 41 does not rotate and braking by the brake mechanism 6 is not possible.

The level-wind mechanism 7, as shown in FIGS. 1 and 2, is a mechanism for shifting the spool 4 in a back and forth direction by shifting the spool axle 8 fixed to the center of the spool 4 in the same direction. The level-wind mechanism 7 has a spiral axle 51 disposed beneath the spool axle 8, a slider 52 that shifts back and forth along the spiral axle 51, and an intermediate gear 53 fixed to an end of the spiral axle 51. The spiral axle 51 is disposed parallel to the spool axle 8 and is rotatably supported by the body 2a. Further, screw grooves 51a are formed on the periphery of the spiral axle 51. The slider 52 is fixed to the rear end of the spool axle 8. The intermediate gear 53 meshes with the pinion gear 12.

Reel Operation and Action

When casting, the bail 9 is flung toward the line release position and the fishing rod is swung out, and the fishing line wound on the spool 4 is wound out.

When the fishing line is to be reeled in, the bail 9 is put back into the line-winding position. When the handle 1 is rotated in this situation, the torque is transmitted to the pinion gear 12 through the handle shaft 10 and the master gear 11. Since zinc alloy or high-strength synthetic resin likewise as is conventional is used in the tooth ring 11b of the master gear 11, in transmitting torque from the master gear 11 to the pinion gear 12, their strength and precision are maintained. Moreover, since aluminum alloy or stainless steel alloy is used in disk 11a it is possible to design for lightening or improvement in anti-corrosiveness.

Torque transmitted to the pinion gear 12 is transmitted to the rotor 3 through the front portion 12a of the pinion gear 12. Herein, since the rotor 3 rotates in the line winding direction, due to the one-way clutch 32 the torque, as stated before, is not transmitted to the rotation cylinder 41. Moreover, when the pinion gear 12 rotates, the rotation is transmitted to the level-wind mechanism 7 by means of the intermediate gear 53, and the spool axle 8 shifts back and forth in the longitudinal direction.

When the rotor 3 is reversed to play a fish, the pivot lever 22 is swung 45 degrees to the left into the braking release state. In so doing, the brake lever 30 is restored into the braking release position by the (not shown) urging element. The brake lever 30 is manipulated in this situation to play out a fish. If the fishing line is tugged by a fish, reversing the rotor 3, as stated before, the torque is transmitted to the rotation cylinder 41 through the one-way clutch 32, and further is transmitted through the universal joint 45 to the brake cylinder 40, whereby the brake cylinder 40 rotates unitarily with the rotor 3. Then, when the brake lever 30 is pivoted in the direction opposite arrow A in FIG. 1, the brake operation portion 30*b* presses on the inner periphery of the end 40*a* of the outer peripheral surface of the brake cylinder 40, tilting the brake cylinder 40 into the position indicated by the double-dotted broken line in FIG. 5, compressing the outer periphery of the end 40*a* of the outer peripheral surface against the brake shoe 42. This results in a braking action on the rotor 3 in reversing.

By adding or reducing the force put on the brake lever 30, it is possible to adjust the braking force at will by adjusting the amount by which the rotor 3 is reversed. Therein, further, since the brake cylinder 40 is pivotably supported on the rotation cylinder 41 by the universal joint 45, the force does not act on the pinion gear 12 so as to put it out of whack, and there is no drag on the rotation of the rotor 3. Since an outer-race free type one-way clutch 32 is utilized, the higher the spinning speed is, both reversing and spinning at high-speed the rotation of the rotor 3, the more the action during the onset of braking is stable.

When shifting fishing spots or storing the reel, the pivot lever 22 is pivoted from 45 degrees to the left to 45 degrees to the right, pivoting the brake lever 30 into the braking position.

Other Embodiments (a) The present invention is not limited to a spinning reel face gear put onto a brake lever, but also may be applied to front-drag type or rear-drag type spinning reels or to other spinning reels.

(b) The tooth ring may be manufactured by cutting work. The cutting work may be done either before joining or after joining to the disk.

(c) The tooth ring may be formed by molding and the teeth shape may be rectified post-molding with a tool known as a pinion cutter. Generally, pinion cutters are utilized which have the same form as the companion pinion gear to be meshed with, and by shifting the meshing position of the cutter from its regular position, teeth rectification known as crowning or relieving is carried out on the surface of the face gear; however, on the cutter itself the teeth may be rectified beforehand so as to get the face gear into such form.

With a spinning reel face gear in connection with the present invention, because the tooth ring that is to be the meshing portion is formed of a separate material from the disk, it is possible to design a lightened face gear of improved anti-corrosiveness, maintaining its strength and precision, by manufacturing the disk with lightweight materials and materials that are anti-corrosive, and by manufacturing the tooth ring with materials by which its strength and precision are maintainable.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A method for manufacturing a spinning reel face gear configured to have a tooth ring formed separately onto a disk, the method comprising steps of:

forming a gear blank comprising a disk having circumferentially spaced outer peripheral indentations for unitarily retaining the tooth ring;

setting the gear blank into a mold comprising
a cavity plate having a cavity portion conforming to a reverse side of the disk and including a first circumferential margin for forming a reverse side of the tooth ring, and
a core plate having a core portion conforming to an obverse side of the disk and including a second circumferential margin for forming an obverse side of the tooth ring, wherein mating the first and second circumferential margins constitutes a tooth-ring insert form;

closing the mold and injecting into the tooth-ring insert form one selected from the group consisting of metal alloys and synthetic polymer resins; and opening the mold and ejecting the face gear for finishing, wherein no parting line is formed on the obverse face of the tooth ring.

2. A method for manufacturing a spinning reel face gear as set forth in claim 1, wherein a serrated annular recess for forming gear teeth on the tooth ring is formed encompassing the core portion of the core plate.

3. A method for manufacturing a spinning reel face gear as set forth in claim 2, wherein the serrated annular recess is configured to taper the tooth ring obversely.

4. A method for manufacturing a spinning reel face gear as set forth in claim 2, further comprising a step of rectifying the gear teeth with a pinion cutter after the face gear is ejected from the mold.

5. A method for manufacturing a spinning reel face gear as set forth in claim 1, wherein the gear blank is formed integrally with face gear handle shaft.

6. A method for manufacturing a spinning reel face gear as set forth in claim 1, wherein the outer peripheral indentations on the gear blank disk are semi-circular.

7. A method for manufacturing a spinning reel face gear as set forth in claim 1, wherein the gear blank is formed of one selected from the group consisting of aluminum, stainless steel, and titanium alloys.

8. A method for manufacturing a spinning reel face gear as set forth in claim 1, wherein a metal alloy is selected to form the tooth-ring and is injected indirectly into the tooth-ring insert form via a molten-metal sink.

9. A method for manufacturing a spinning reel face gear as set forth in claim 1, further comprising a step of forming gear teeth on the tooth ring by cutting work after the face gear is ejected from the mold.

* * * * *